(12) United States Patent
Shen et al.

(10) Patent No.: US 9,577,515 B2
(45) Date of Patent: Feb. 21, 2017

(54) CONTROLLER FOR GENERATING JITTERS IN A QUASI RESONANT MODE AND METHOD FOR GENERATING JITTERS IN A QUASI RESONANT MODE

(71) Applicant: Leadtrend Technology Corp., Hsin-Chu (TW)

(72) Inventors: Yi-Lun Shen, Hsin-Chu (TW); Yu-Yun Huang, Hsin-Chu (TW)

(73) Assignee: Leadtrend Technology Corp., Hsinchu County (TW)

( * ) Notice: Subject to any disclaimer, the term of this patent is extended or adjusted under 35 U.S.C. 154(b) by 60 days.

(21) Appl. No.: 14/337,243

(22) Filed: Jul. 22, 2014

(65) Prior Publication Data

US 2015/0029763 A1 Jan. 29, 2015

(30) Foreign Application Priority Data

Jul. 23, 2013 (TW) .............................. 102126342 A (51) Int. Cl.
*H02M 3/335* (2006.01)
*H02M 1/44* (2007.01)
*H02M 1/08* (2006.01)
*H02M 1/00* (2006.01)

(52) U.S. Cl.
CPC ................ *H02M 1/44* (2013.01); *H02M 1/08* (2013.01); *H02M 3/33523* (2013.01); *H02M 2001/0025* (2013.01); *Y02B 70/1433* (2013.01)

(58) Field of Classification Search
CPC . Y02B 70/1433; H02M 3/33507; H02M 3/24; H02M 3/335; H02M 1/44; H02M 3/33515; H02M 1/08; H02M 3/33523; H02M 2001/0025
See application file for complete search history.

(56) References Cited

U.S. PATENT DOCUMENTS

| 8,098,502 B2 | 1/2012 | Mao | |
|---|---|---|---|
| 2010/0237960 A1* | 9/2010 | Yeh | ........................ H03K 4/502 331/177 R |
| 2010/0321956 A1* | 12/2010 | Yeh | ................... H02M 3/33507 363/16 |

(Continued)

FOREIGN PATENT DOCUMENTS

| CN | 101888175 A | 11/2010 |
|---|---|---|
| CN | 102761274 A | 10/2012 |

(Continued)

*Primary Examiner* — Gustavo Rosario Benitez
(74) *Attorney, Agent, or Firm* — Winston Hsu; Scott Margo (57) ABSTRACT

A controller for generating jitters in a quasi resonant mode includes a feedback pin, a voltage generation unit, a pulse generator, and a comparator. The feedback pin is used for receiving a feedback voltage from a secondary side of a power converter. The voltage generation unit is used for generating a first voltage according to the feedback voltage and a pulse. The pulse generator is used for generating the pulse when a control signal controlling a power switch of a primary side of the power converter is enabled. The comparator is used for controlling enabling and disabling of a switching signal according to the first voltage and a variable reference voltage. The variable reference voltage is monotonously swung within a predetermined range according to a digital signal.

18 Claims, 8 Drawing Sheets

(56) References Cited

U.S. PATENT DOCUMENTS

| | | | |
|---|---|---|---|
| 2011/0032024 A1* | 2/2011 | Chen | H03K 17/687 327/524 |
| 2011/0085356 A1 | 4/2011 | Morota | |
| 2012/0039098 A1 | 2/2012 | Berghegger | |
| 2012/0081084 A1* | 4/2012 | Yang | H02M 3/33507 323/235 |
| 2012/0300499 A1* | 11/2012 | Chang | H02M 1/36 363/16 |
| 2012/0320632 A1* | 12/2012 | Kalodka | H02M 3/33507 363/16 |
| 2013/0083565 A1* | 4/2013 | Gaknoki | H02M 1/08 363/21.17 |
| 2013/0128627 A1* | 5/2013 | Moon | H02M 3/33507 363/21.17 |
| 2013/0294118 A1* | 11/2013 | So | H02M 3/33507 363/21.16 |
| 2014/0071718 A1* | 3/2014 | Lin | H02M 1/32 363/21.18 |

FOREIGN PATENT DOCUMENTS

| | | |
|---|---|---|
| CN | 102891603 A | 1/2013 |
| CN | 102957309 A | 3/2013 |
| TW | 201218590 A1 | 5/2012 |
| TW | 201310878 | 3/2013 |
| TW | 201318324 | 5/2013 |

\* cited by examiner

CONTROLLER FOR GENERATING JITTERS IN A QUASI RESONANT MODE AND METHOD FOR GENERATING JITTERS IN A QUASI RESONANT MODE

BACKGROUND OF THE INVENTION

1. Field of the Invention

The present invention relates to a controller of a power supply and a related method thereof, and particularly to a controller and a related method thereof that can generate jitters in a quasi resonant mode of a power supply.

2. Description of the Prior Art

The switching power supply has been applied to most of consumer electronic devices. The switching power supply can control storing power and releasing power of an inductor through switching of a power switch to provide power matching a specification requirement. However, if switching of the power switch always stays at a specific frequency, the power switch can easily radiate an electromagnetic wave with the specific frequency through transmission lines in the consumer electronic devices, resulting in the switching power supply suffering electromagnetic interference.

In a quasi resonant mode of the switching power supply, the quasi resonant mode can make the power switch of the switching power supply be naturally switched at different valleys to generate similar to natural jitters. However, when the switching power supply operates practically, the power switch of the switching power supply is only usually switched at a fixed valley, resulting in the natural jitters disappearing. Therefore, decrease of electromagnetic interference executed by the quasi resonant mode of the switching power supply is not significant, resulting in the quasi resonant mode of the switching power supply not satisfying a specification for electromagnetic interference.

SUMMARY OF THE INVENTION

An embodiment provides a controller for generating jitters in a quasi resonant mode. The controller includes a feedback pin, a voltage generation unit, a pulse generator, and a comparator. The feedback pin is used for receiving a feedback voltage from a secondary side of a power converter. The voltage generation unit is used for generating a first voltage according to the feedback voltage and a pulse. The pulse generator is used for generating the pulse when a control signal controlling a power switch of a primary side of the power converter is enabled. The comparator is used for controlling enabling and disabling of a switching signal according to the first voltage and a variable reference voltage, wherein the variable reference voltage is monotonously swung within a predetermined range according to a digital signal.

Another embodiment provides a controller for generating jitters in a quasi resonant mode. The controller includes a feedback pin, a voltage generation unit, a pulse generator, and a comparator. The feedback pin is used for receiving a feedback voltage from a secondary side of a power converter. The voltage generation unit is used for generating a first voltage according to the feedback voltage, a pulse, and a digital signal. The pulse generator is used for generating the pulse when a control signal controlling a power switch of a primary side of the power converter is enabled. The comparator is used for controlling enabling and disabling of a switching signal according to the first voltage and a reference voltage.

Another embodiment provides a method for generating jitters in a quasi resonant mode. The method includes receiving a feedback voltage from a secondary side of a power converter; generating a first voltage according to the feedback voltage and a pulse; and controlling enabling and disabling of a switching signal according to the first voltage and a variable reference voltage; wherein the variable reference voltage is monotonously swung within a predetermined range according to a digital signal.

Another embodiment provides a method for generating jitters in a quasi resonant mode. The method includes receiving a feedback voltage from a secondary side of a power converter; generating a first voltage according to the feedback voltage, a pulse, and a digital signal; and controlling enabling and disabling of a switching signal according to the first voltage and a reference voltage.

The present invention provides a controller for generating jitters in a quasi resonant mode and a method for generating jitters in a quasi resonant mode. The controller and the method utilize a variable reference voltage, a variable capacitor, or a variable current source of the controller to generate a switching signal changed with time. Because the switching signal is changed with time, a switching frequency of a power switch of a primary side of a power converter is also changed with time. Therefore, compared to the prior art, the present invention can jitter the switching frequency of the power switch in spectrum to execute power dispersion and reduce peak power of electromagnetic interference.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
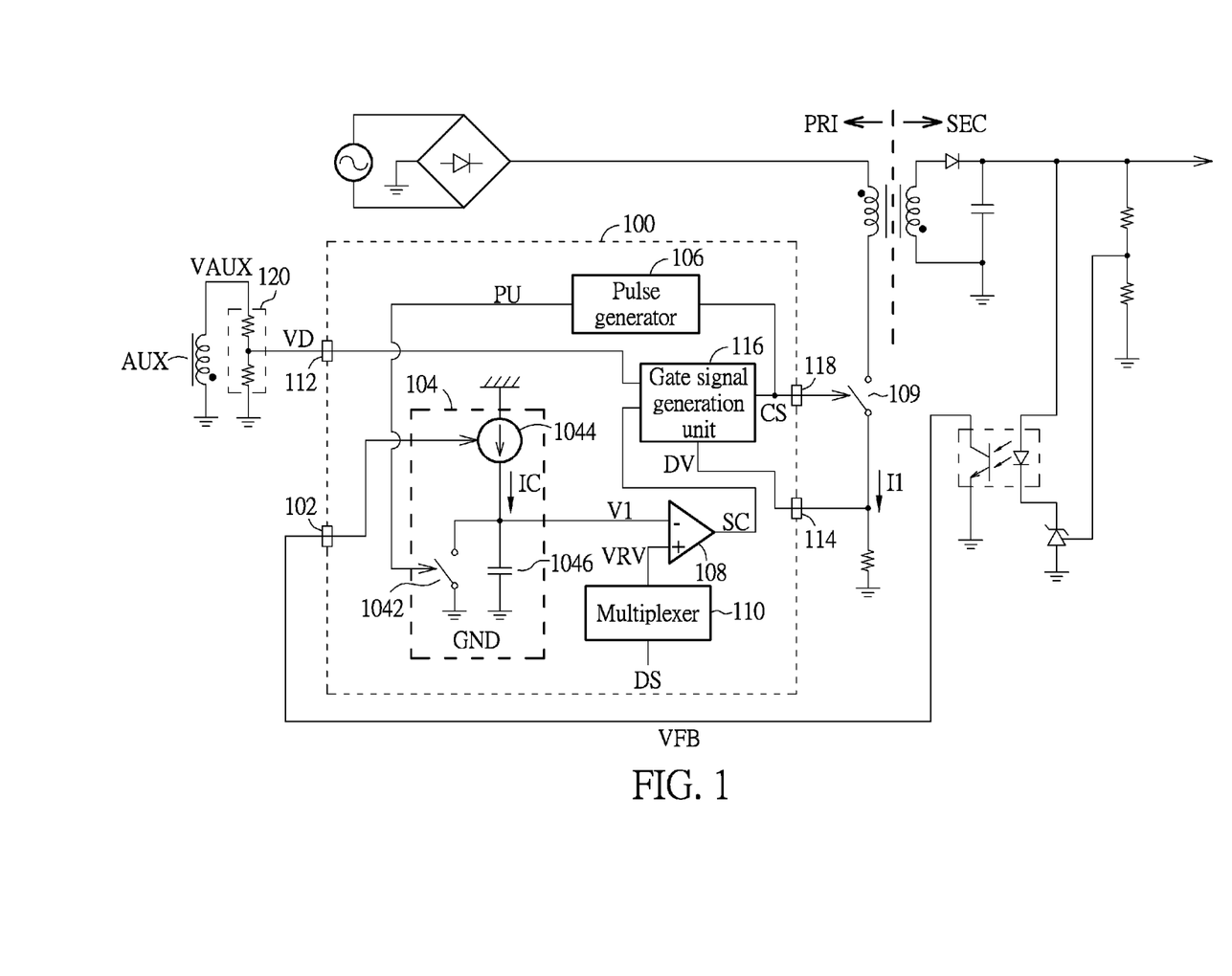
FIG. 1 is a diagram illustrating a controller for generating jitters in a quasi resonant mode according to an embodiment.

Please refer to FIG. 1. FIG. 1 is a diagram illustrating a controller 100 for generating jitters in a quasi resonant mode according to an embodiment. The controller 100 includes a feedback pin 102, a voltage generation unit 104, a pulse generator 106, and a comparator 108. The feedback pin 102 is used for receiving a feedback voltage VFB from a secondary side SEC of a power converter, wherein the feedback voltage VFB corresponds to a load of the secondary side SEC of the power converter. The voltage generation unit 104 is used for generating a first voltage V1 according to the feedback voltage VFB and a pulse PU. The pulse generator 106 is used for generating the pulse PU when a control signal CS controlling a power switch 109 of a primary side PRI of the power converter is enabled. The comparator 108 is used for controlling enabling and disabling of a switching signal SC according to the first voltage V1 and a variable reference voltage VRV, wherein the variable reference voltage VRV is monotonously swung within a predetermined range according to a digital signal DS. In addition, the controller 100 further includes a multiplexer 110, an auxiliary pin 112, a current detecting pin 114, a gate signal generation unit 116, and a gate pin 118. The multiplexer 110 is used for monotonously adjusting the variable reference voltage VRV with time within the predetermined range according to the digital signal DS (that is, the variable reference voltage VRV can be monotonously swung with time within the predetermined range). The auxiliary pin 112 is used for receiving a voltage VD corresponding to an auxiliary winding AUX of the power converter, wherein the voltage VD is generated by a voltage divider 120 coupled to the auxiliary winding AUX. The current detecting pin 114 is used for generating a detection voltage DV according to a current I1 flowing through the primary side PRI of the power converter. The gate signal generation unit 116 is used for determining enabling and disabling of the control signal CS according to the detection voltage DV, the voltage VD, and the switching signal SC. In addition, the control signal CS is transmitted to the power switch 109 through the gate pin 118 to control turning-on and turning-off of the power switch 109, and the pulse generator 106 is coupled to the gate pin 118.

As shown in FIG. 1, the voltage generation unit 104 includes a switch 1042, a current source 1044, and a capacitor 1046. The switch 1042 is turned on according to the pulse PU, wherein when the switch 1042 is turned on, the first voltage V1 is pulled down to ground GND (e.g. 0V). The current source 1044 is used for providing a charging current IC controlled by the feedback voltage VFB. The capacitor 1046 is coupled between the current source 1044 and the ground GND for generating the first voltage V1 according to the charging current IC when the switch 1042 is turned off.

Figure 2:
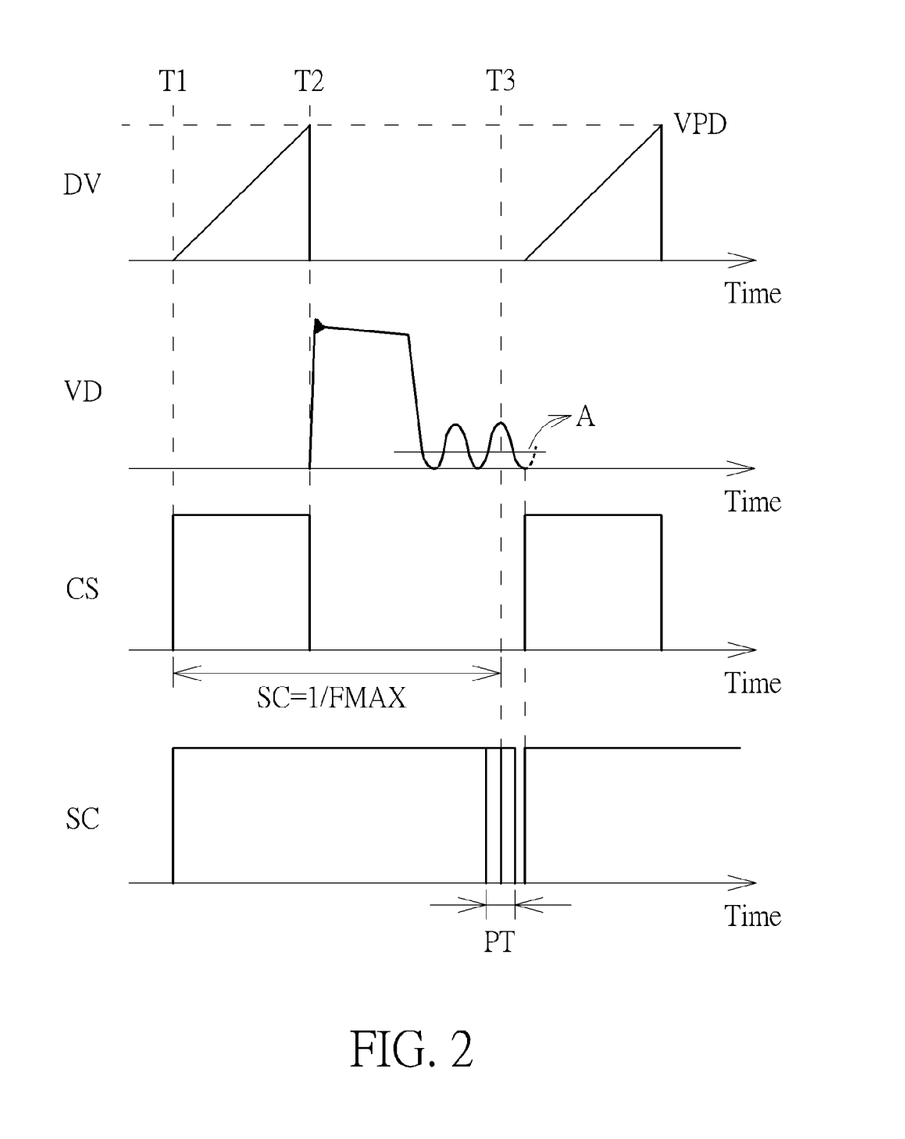
FIG. 2 is a diagram illustrating the voltage, the control signal, the detection voltage, and the switching signal.

Please refer to FIG. 2. FIG. 2 is a diagram illustrating the voltage VD, the control signal CS, the detection voltage DV, and the switching signal SC. As shown in FIG. 1 and FIG. 2, when the gate signal generation unit 116 enables the control signal CS at time T1, the pulse generator 106 generates the pulse PU according to the enabled control signal CS, resulting in the switch 1042 being turned on and the first voltage V1 is pulled down to the ground GND (e.g. 0V). Meanwhile, because the first voltage V1 is less than the variable reference voltage VRV, the comparator 108 enables the switching signal SC. After the pulse PU is completed, the switch 1042 is turned off, resulting in the charging current IC controlled by the feedback voltage VFB starting to charge the capacitor 1046. At time T2, when the detection voltage DV exceeds a predetermined voltage VPD, the gate signal generation unit 116 disables the control signal CS, resulting in the voltage VD being increased. Meanwhile, the charging current IC still continuously charges the capacitor 1046 until the first voltage V1 is greater than the variable reference voltage VRV. At time T3, when the first voltage V1 is greater than the variable reference voltage VRV, the comparator 108 disables the switching signal SC. Because the multiplexer 110 can monotonously adjust the variable reference voltage VRV with time within the predetermined range according to the digital signal DS, the switching signal SC can be disabled by the comparator 108 within a predetermined time range PT, that is to say, enabling of the switching signal SC is monotonously changed with time. As shown in FIG. 1 and FIG. 2, after the switching signal SC is disabled, the gate signal generation unit 116 enables the control signal CS again at a first valley of the voltage VD (a point A as shown in FIG. 2), resulting in the controller 100 starting the above mentioned operation repeatedly.

Figure 3:
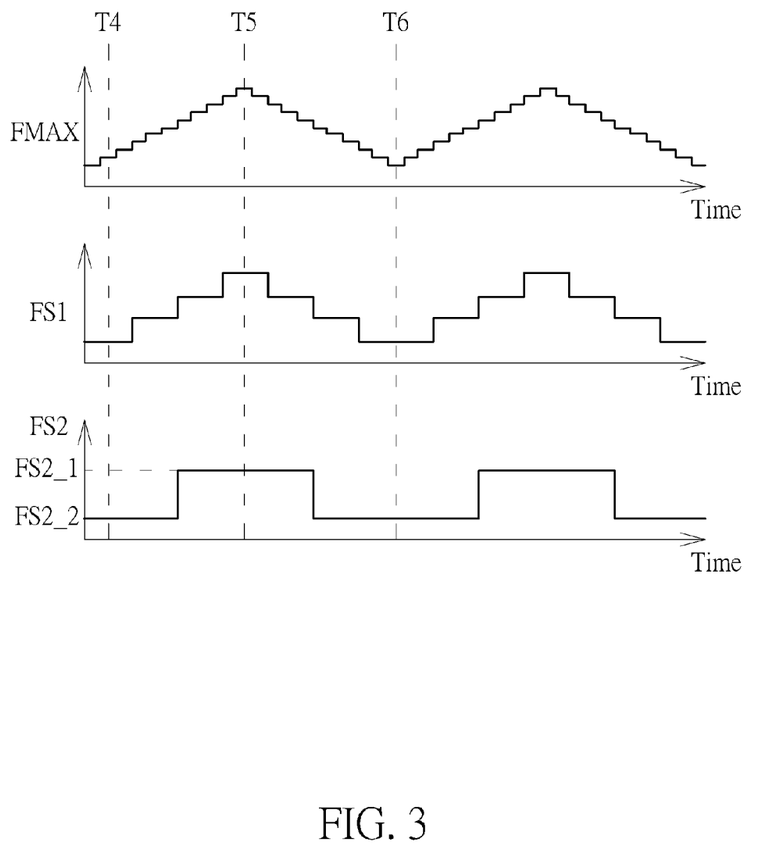
FIG. 3 is a diagram illustrating a frequency corresponding to the switching signal and practical switching frequencies of the power switch.

Please refer to FIG. 3. FIG. 3 is a diagram illustrating a frequency FMAX corresponding to the switching signal SC and practical switching frequencies FS1, FS2 of the power switch 109. As shown in FIG. 3, because enabling of the switching signal SC is monotonously changed with time, the frequency FMAX is also monotonously increased/decreased with time (e.g. the frequency FMAX is gradually increased from time T4 to time T5, and is gradually decreased from the time T5 to time T6). Therefore, when the predetermined time range PT is larger, because the gate signal generation unit 116 can enable the control signal CS between more than two different valleys of the voltage VD, the practical switching frequency FS1 of the power switch 109 can be monotonously increased/decreased with time similar to the frequency FMAX; and when the predetermined time range PT is smaller, because the gate signal generation unit 116 can enable the control signal CS between two adjacent valleys of the voltage VD, the practical switching frequency FS2 of the power switch 109 is also switched between two adjacent switching frequencies FS2_1, FS2_2. Therefore, the controller 100 can jitter a switching frequency of the power switch 109 in spectrum to execute power dispersion and reduce peak power of electromagnetic interference.

Figure 4:
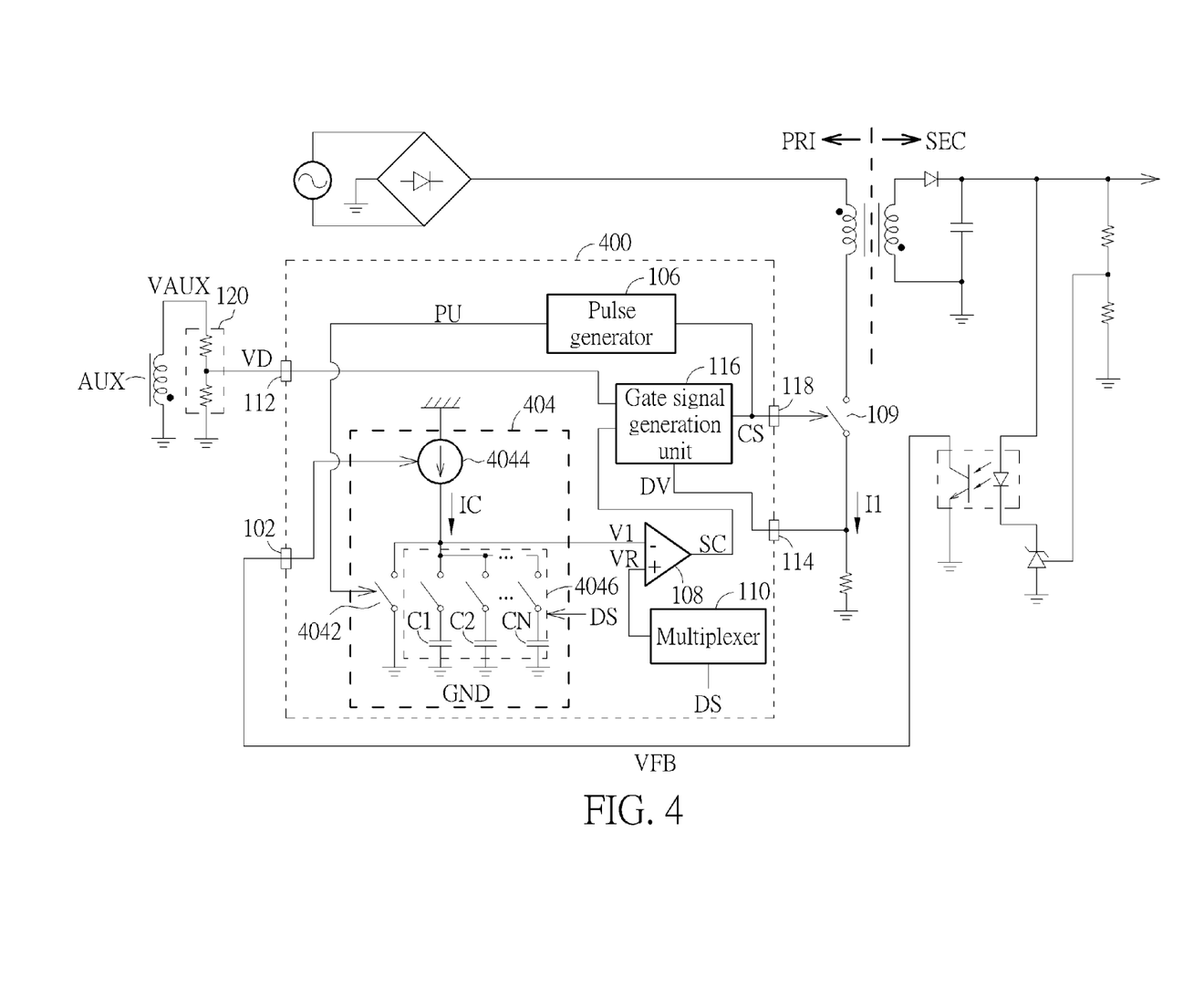
FIG. 4 is a diagram illustrating a controller for generating jitters in a quasi resonant mode according to another embodiment.

Please refer to FIG. 2, FIG. 3, and FIG. 4. FIG. 4 is a diagram illustrating a controller 400 for generating jitters in a quasi resonant mode according to another embodiment. As shown in FIG. 4, a difference between the controller 400 and the controller 100 is that a voltage generation unit 404 of the controller 400 is used for generating a first voltage V1 according to a feedback voltage VFB, a pulse PU, and a digital signal DS. A comparator 108 of the controller 400 is used for controlling enabling and disabling of a switching signal SC according to the first voltage V1 and a reference voltage VR, wherein the reference voltage VR is a fixed reference voltage. As shown in FIG. 4, the voltage generation unit 404 includes a switch 4042, a current source 4044, and a variable capacitor 4046, wherein the switch 4042 and the current source 4044 are the same as the switch 1042 and the current source 1044 in FIG. 1, so further description thereof is omitted for simplicity. The variable capacitor 4046 is coupled between the current source 4044 and the ground GND for monotonously changing a capacitance of the variable capacitor 4046 according to the digital signal DS, and for generating the first voltage V1 according to a charging current IC and the capacitance of the variable capacitor 4046 when the switch 4042 is turned off. As shown in FIG. 4, the variable capacitor 4046 includes a plurality of capacitors C1-CN, wherein the plurality of capacitors C1-CN can be the same or different, and N is a positive integer. Therefore, when the capacitance of the variable capacitor 4046 is monotonously increased/decrease V1 is also monotonously increased/decreased with time, resulting in enabling of the switching signal SC generated by the comparator 108 being also monotonously changed with time (As shown in FIG. 2). Therefore, as shown in FIG. 3, because enabling of the switching signal SC is monotonously changed with time, the frequency FMAX is also monotonously increased/decreased with time. In addition, subsequent operational principles of the controller 400 are the same as those of the controller 100, so further description thereof is omitted for simplicity.

Figure 5:
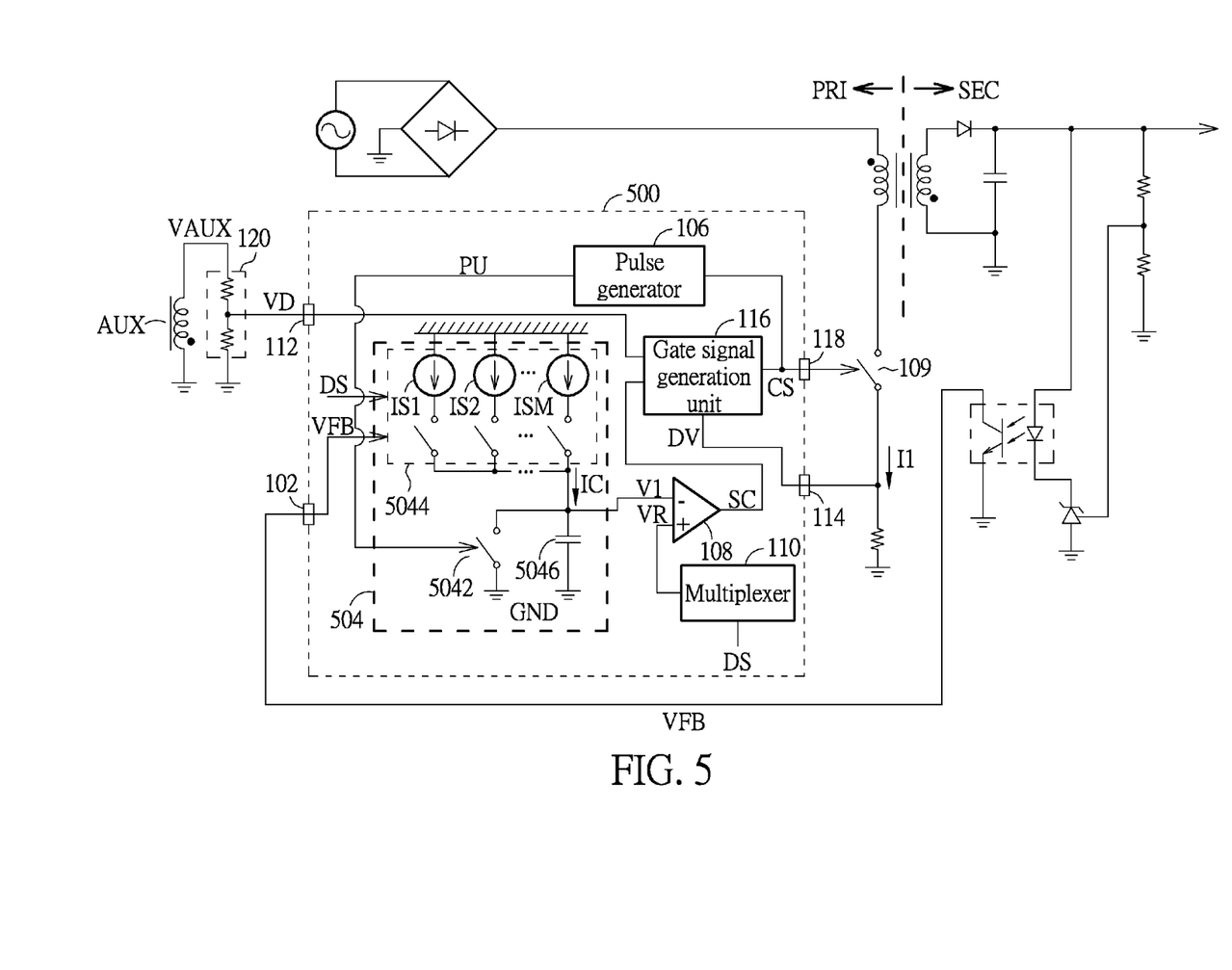
FIG. 5 is a diagram illustrating a controller for generating jitters in a quasi resonant mode according to another embodiment.

Please refer to FIG. 2, FIG. 3, and FIG. 5. FIG. 5 is a diagram illustrating a controller 500 for generating jitters in a quasi resonant mode according to another embodiment. As shown in FIG. 5, a difference between the controller 500 and the controller 100 is that a voltage generation unit 504 of the controller 500 is used for generating a first voltage V1 according to a feedback voltage VFB, a pulse PU, and a digital signal DS. A comparator 108 of the controller 500 is used for controlling enabling and disabling of a switching signal SC according to the first voltage V1 and a reference voltage VR, wherein the reference voltage VR is a fixed reference voltage. As shown in FIG. 5, the voltage generation unit 504 includes a switch 5042, a variable current source 5044, and a capacitor 5046, wherein the switch 5042 and the capacitor 5046 are the same as the switch 1042 and the capacitor 1046 in FIG. 1, so further description thereof is omitted for simplicity. The variable current source 5044 is used for monotonously changing a charging current IC of the variable current source 5044 according to the feedback voltage VFB and the digital signal DS. Therefore, when the switch 5042 is turned off, the capacitor 5046 can generate the first voltage V1 according to the variable charging current IC and a capacitance of the capacitor 5046. As shown in FIG. 5, the variable current source 5044 includes a plurality of current source IS1-ISM, wherein the plurality of current source IS1-ISM can be the same or different, and M is a positive integer. Therefore, when the charging current IC is monotonously increased/decreased with time according to the digital signal DS, the first voltage V1 is also monotonously increased/decreased with time, resulting in enabling of the switching signal SC generated by the comparator 108 being also monotonously changed with time (As shown in FIG. 2). Therefore, as shown in FIG. 3, because enabling of the switching signal SC is monotonously changed with time, the frequency FMAX is also monotonously increased/decreased with time. In addition, subsequent operational principles of the controller 500 are the same as those of the controller 100, so further description thereof is omitted for simplicity.

In addition, in another embodiment of the present invention, a voltage generation unit utilizes a variable current source and a variable capacitor to generate a first voltage changed with time. Then, a comparator generates a switching signal changed with time according to the first voltage changed with time. In addition, the present invention is not limited to enabling of the switching signal SC being monotonously changed with time in FIG. 2 and the frequency FMAX being monotonously increased/decreased with time in FIG. 3. That is to say, any configuration in which the frequency FMAX is changed with time through variation of the switching signal SC falls within the scope of the present invention.

Figure 6:
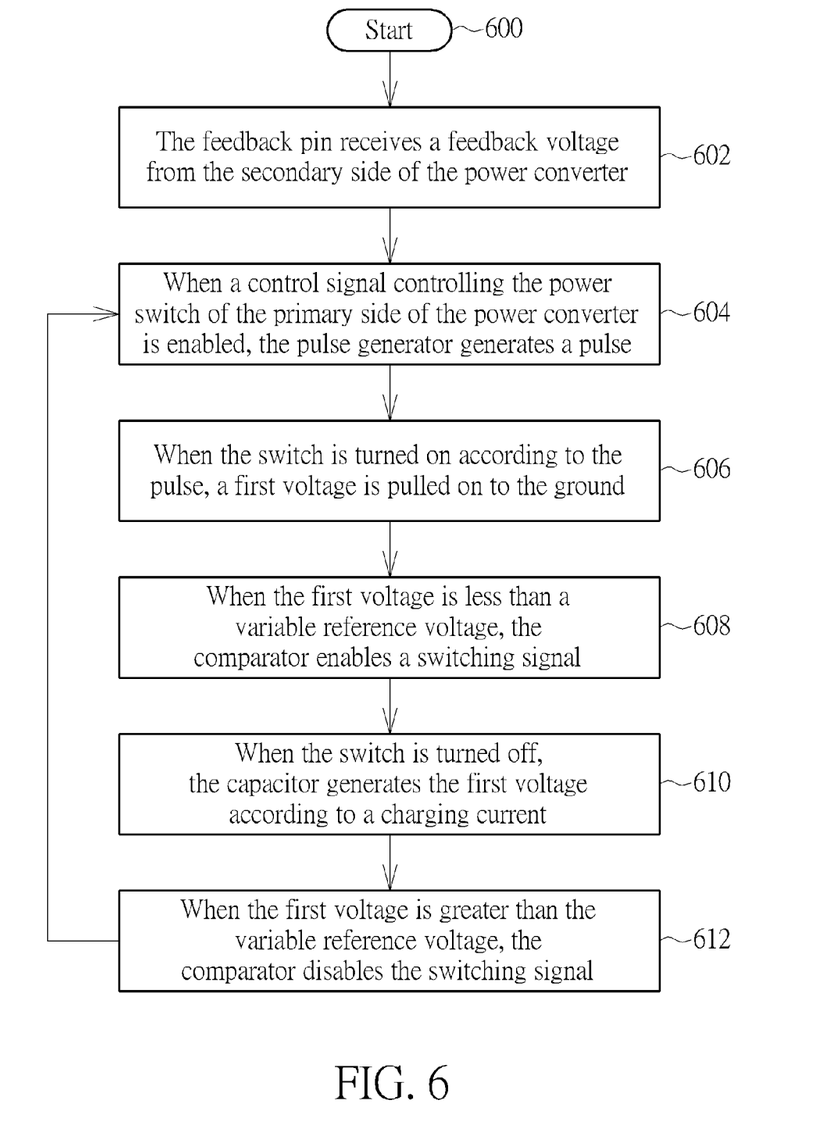
FIG. 6 is a flowchart illustrating a method for generating jitters in a quasi resonant mode according to another embodiment.

Please refer to FIG. 1, FIG. 2, FIG. 3, and FIG. 6. FIG. 6 is a flowchart illustrating a method for generating jitters in a quasi resonant mode according to another embodiment. The method in FIG. 6 is illustrated using the controller 100 in FIG. 1. Detailed steps are as follows:

Step 600: Start.

Step 602: The feedback pin 102 receives a feedback voltage VFB from the secondary side SEC of the power converter.

Step 604: When a control signal CS controlling the power switch 109 of the primary side PRI of the power converter is enabled, the pulse generator 106 generates a pulse PU.

Step 606: When the switch 1042 is turned on according to the pulse PU, a first voltage V1 is pulled on to the ground GND.

Step 608: When the first voltage V1 is less than a variable reference voltage VRV, the comparator 108 enables a switching signal SC.

Step 610: When the switch 1042 is turned off, the capacitor 1046 generates the first voltage V1 according to a charging current IC.

Step 612: When the first voltage V1 is greater than the variable reference voltage VRV, the comparator 108 disables the switching signal SC, go to Step 604.

In Step 602, the feedback voltage VFB corresponds to a load of the secondary side SEC of the power converter. In Step 604, as shown in FIG. 1 and FIG. 2, when the gate signal generation unit 116 enables the control signal CS at the time T1, the pulse generator 106 generates the pulse PU according to the enabled control signal CS. Therefore, in Step 606, the switch 1042 is turned on according to the pulse PU and the first voltage V1 is pulled down to the ground GND (e.g. 0V). In Step 608, because the first voltage V1 is less than the variable reference voltage VRV, the comparator 108 enables the switching signal SC, wherein the multiplexer 110 can monotonously adjust the variable reference voltage VRV with time within a predetermined range according to the digital signal DS. In Step 610, after the pulse PU is completed, the switch 1042 is turned off, resulting in the charging current IC controlled by the feedback voltage VFB starting to charge the capacitor 1046. That is to say, the capacitor 1046 generates the first voltage V1 according to the charging current IC. As shown in FIG. 1 and FIG. 2, at the time T2, when a detection voltage DV (a voltage VD is generated by the voltage divider 120 coupled to the auxiliary winding AUX) exceeds a predetermined voltage VPD, the gate signal generation unit 116 disables the control signal CS, resulting in the voltage VD being increased. Meanwhile, the charging current IC still continuously charges the capacitor 1046 until the first voltage V1 is greater than the variable reference voltage VRV. In Step 612, as shown in the time T3 of FIG. 2, when the first voltage V1 is greater than the variable reference voltage VRV, the comparator 108 disables the switching signal SC. Because the multiplexer 110 can monotonously adjust the variable reference voltage VRV with time within the predetermined range according to the digital signal DS, the switching signal SC can be disabled by the comparator 108 within a predetermined time range PT, that is to say, enabling of the switching signal SC is monotonously changed with time. As shown in FIG. 1 and FIG. 2, after the switching signal SC is disabled, the gate signal generation unit 116 enables the control signal CS again at the first valley of the voltage VD (the point A as shown in FIG. 2), resulting in controller 100 starting the above mentioned operation repeatedly.

As shown in FIG. 3, because enabling of the switching signal SC is monotonously changed with time, the frequency FMAX corresponding to the switching signal SC is also monotonously increased/decreased with time (e.g. the frequency FMAX is gradually increased from the time T4 to the time T5, and is gradually decreased from the time T5 to the time T6). Therefore, when the predetermined time range PT is larger, because the gate signal generation unit 116 can enable the control signal CS between more than two different valleys of the voltage VD, the practical switching frequency FS1 of the power switch 109 can be monotonously increased/decreased with time similar to the frequency FMAX; and when the predetermined time range PT is smaller, because the gate signal generation unit 116 can enable the control signal CS between two adjacent valleys of the voltage VD, the practical switching frequency FS2 of the power switch 109 is also switched between two adjacent switching frequencies FS2_1, FS2_2. Therefore, the controller 100 can jitter a switching frequency of the power switch 109 in spectrum to execute power dispersion and reduce peak power of electromagnetic interference.

Figure 7:
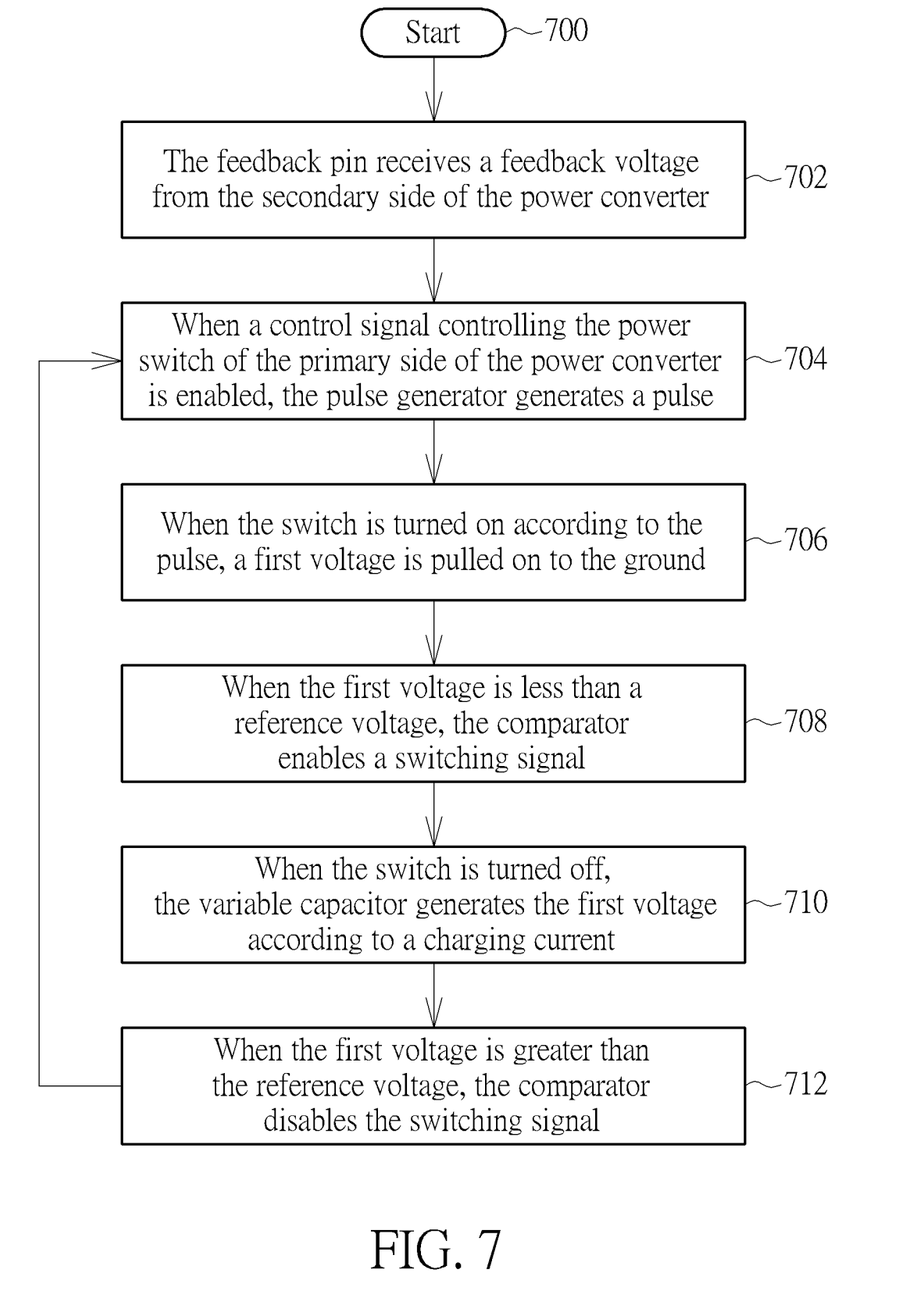
FIG. 7 is a flowchart illustrating a method for generating jitters in a quasi resonant mode according to another embodiment.

Please refer to FIG. 2, FIG. 3, FIG. 4, and FIG. 7. FIG. 7 is a flowchart illustrating a method for generating jitters in a quasi resonant mode according to another embodiment. The method in FIG. 7 is illustrated using the controller 400 in FIG. 4. Detailed steps are as follows:

Step 700: Start.

Step 702: The feedback pin 102 receives a feedback voltage VFB from the secondary side SEC of the power converter.

Step 704: When a control signal CS controlling the power switch 109 of the primary side PRI of the power converter is enabled, the pulse generator 106 generates a pulse PU.

Step 706: When the switch 4042 is turned on according to the pulse PU, a first voltage V1 is pulled on to the ground GND.

Step 708: When the first voltage V1 is less than a reference voltage VR, the comparator 108 enables a switching signal SC.

Step 710: When the switch 4042 is turned off, the variable capacitor 4046 generates the first voltage V1 according to a charging current IC.

Step 712: When the first voltage V1 is greater than the reference voltage VR, the comparator 108 disables the switching signal SC, go to Step 704.

A difference between the embodiment of FIG. 7 and the embodiment of FIG. 6 is that in Step 708, because the first voltage V1 is less than the reference voltage VR, the comparator 108 of the controller 400 enables the switching signal SC, wherein the reference voltage VR is a fixed reference voltage; and in Step 710, as shown in FIG. 4, the variable capacitor 4046 can monotonously change a capacitance of the variable capacitor 4046 according to a digital signal DS, and generate the first voltage V1 according to a charging current IC and the capacitance of the variable capacitor 4046 when the switch 4042 is turned off. Therefore, when the capacitance of the variable capacitor 4046 is monotonously increased/decreased with time according to the digital signal DS, the first voltage V1 is also monotonously increased/decreased with time, resulting in enabling of the switching signal SC generated by the comparator 108 being also monotonously changed with time (As shown in FIG. 2). Therefore, as shown in FIG. 3, because enabling of the switching signal SC is monotonously changed with time, the frequency FMAX is also monotonously increased/decreased with time. In addition, subsequent operational principles of the embodiment of FIG. 7 are the same as those of the embodiment of FIG. 6, so further description thereof is omitted for simplicity.

Figure 8:
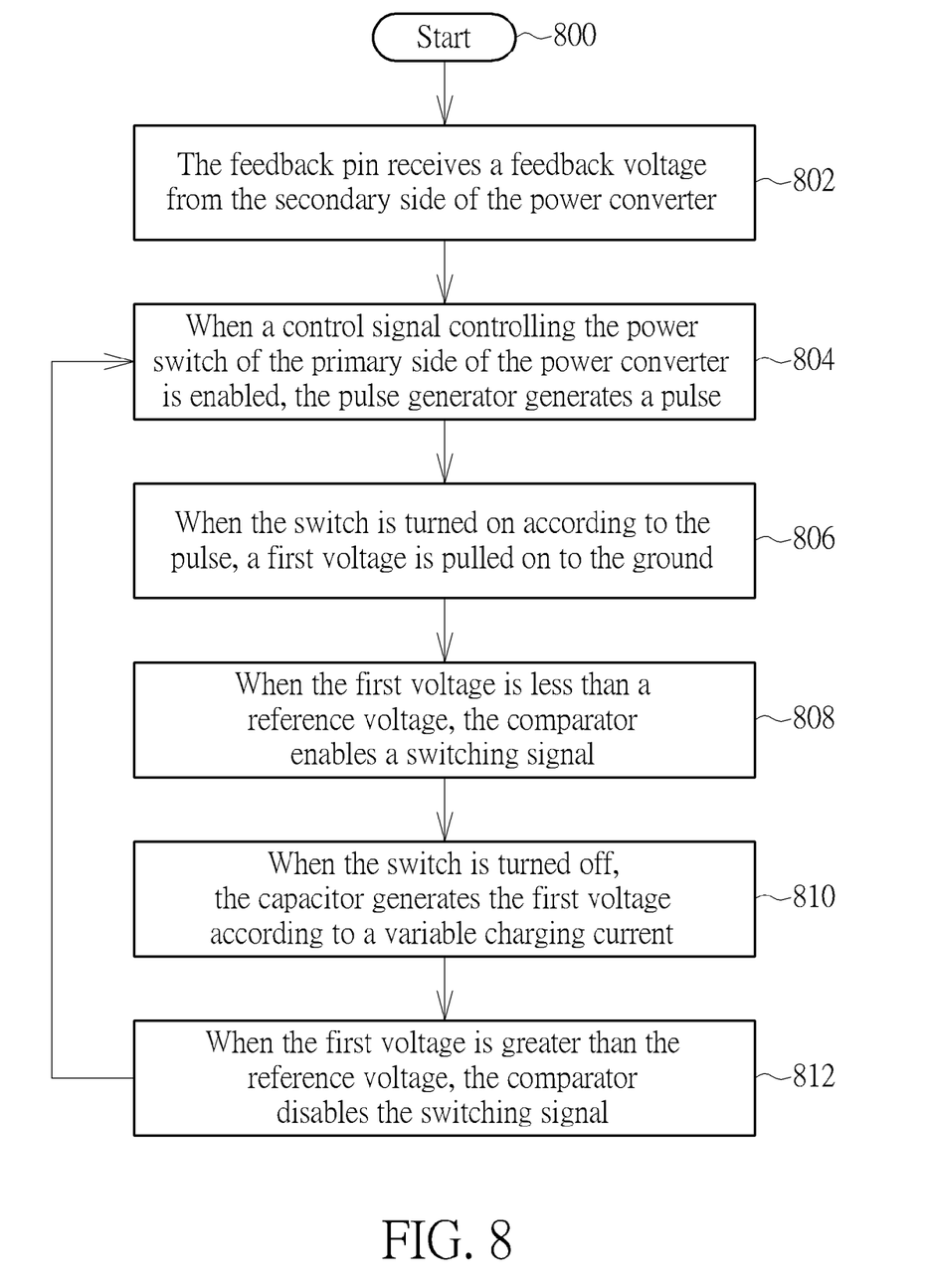
FIG. 8 is a flowchart illustrating a method for generating jitters in a quasi resonant mode according to another embodiment.

Please refer to FIG. 2, FIG. 3, FIG. 5, and FIG. 8. FIG. 8 is a flowchart illustrating a method for generating jitters in a quasi resonant mode according to another embodiment. The method in FIG. 8 is illustrated using the controller 500 in FIG. 5. Detailed steps are as follows:

Step 800: Start.

Step 802: The feedback pin 102 receives a feedback voltage VFB from the secondary side SEC of the power converter.

Step 804: When a control signal CS controlling the power switch 109 of the primary side PRI of the power converter is enabled, the pulse generator 106 generates a pulse PU.

Step 806: When the switch 5042 is turned on according to the pulse PU, a first voltage V1 is pulled on to the ground GND.

Step 808: When the first voltage V1 is less than a reference voltage VR, the comparator 108 enables a switching signal SC.

Step 810: When the switch 5042 is turned off, the capacitor 5046 generates the first voltage V1 according to a variable charging current IC.

Step 812: When the first voltage V1 is greater than the reference voltage VR, the comparator 108 disables the switching signal SC, go to Step 804.

A difference between the embodiment of FIG. 8 and the embodiment of FIG. 6 is that in Step 808, because the first voltage V1 is less than the reference voltage VR, the comparator 108 of the controller 500 enables the switching signal SC, wherein the reference voltage VR is a fixed reference voltage; and Step 810, the variable current source 5044 monotonously changes the variable charging current IC of the variable current source 5044 according to the feedback voltage VFB and the digital signal DS. Therefore, when the switch 5042 is turned off, the capacitor 5046 can generate the first voltage V1 according to the variable charging current IC and a capacitance of the capacitor 5046. Therefore, when the variable charging current IC is monotonously increased/decreased with time according to the digital signal DS, the first voltage V1 is also monotonously increased/decreased with time, resulting in enabling of the switching signal SC generated by the comparator 108 being also monotonously changed with time (As shown in FIG. 2). Therefore, as shown in FIG. 3, because enabling of the switching signal SC is monotonously changed with time, the frequency FMAX is also monotonously increased/decreased with time. In addition, subsequent operational principles of the embodiment of FIG. 8 are the same as those of the embodiment of FIG. 6, so further description thereof is omitted for simplicity.

In addition, the embodiments of FIG. 6, FIG. 7, and FIG. 8 are not limited to enabling of the switching signal SC being monotonously changed with time in FIG. 2 and the frequency FMAX being monotonously increased/decreased with time in FIG. 3. That is to say, any configuration in which the frequency FMAX is changed with time through variation of the switching signal SC falls within the scope of the present invention.

To sum up, the controller for generating jitters in a quasi resonant mode and the method for generating jitters in a quasi resonant mode utilize the variable reference voltage, the variable capacitor, or the variable current source of the controller to generate a switching signal changed with time. Because the switching signal is changed with time, a switching frequency of the power switch of the primary side of the power converter is also changed with time. Therefore, compared to the prior art, the present invention can jitter the switching frequency of the power switch in spectrum to execute power dispersion and reduce peak power of electromagnetic interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A controller for generating jitters in a quasi resonant mode, the controller comprising: a feedback pin for receiving a feedback voltage from a secondary side of a power converter; a voltage generation unit for generating a first voltage according to the feedback voltage and a pulse, wherein the voltage generation unit comprises:
a switch for being turned on according to the pulse, wherein when the switch is turned on, the first voltage is pulled down to ground;
a variable current source for periodically increasing a charging current of the variable current source with time after decreasing the charging current of the variable current source with time, or periodically decreasing the charging current of the variable current source with time after increasing the charging current of the variable current source according to the feedback voltage and a digital signal; and
a capacitor coupled between the variable current source and the ground for generating the first voltage according to the charging current when the switch is turned off;
a pulse generator for generating the pulse when a control signal controlling a power switch of a primary side of the power converter is enabled; and
a comparator for controlling enabling and disabling of a switching signal according to the first voltage and a variable reference voltage, wherein the variable reference voltage is periodically decreased with time after being increased with time, or periodically increased with time after being decreased with time within a predetermined voltage range according to the digital signal.

2. The controller of claim 1, further comprising:
a multiplexer for periodically 'increasing the variable reference voltage with time after decreasing the variable reference voltage with time, or periodically decreasing the variable reference voltage with time after increasing the variable reference voltage with time within the predetermined voltage range according to the digital signal.

3. The controller of claim 1, further comprising:
a gate pin, wherein the control signal is transmitted to the power switch through the gate pin, and the pulse generator is coupled to the gate pin.

4. The controller of claim 1, wherein the feedback voltage corresponds to a load of the secondary side of the power converter.

5. The controller of claim 1, further comprising:
an auxiliary pin for receiving a voltage corresponding to an auxiliary winding of the power converter, wherein the control signal is enabled at a first valley of the voltage after the switching signal is disabled.

6. A controller for generating jitters in a quasi resonant mode, the controller comprising:
a feedback pin for receiving a feedback voltage from a secondary side of a power converter;
a voltage generation unit for generating a first voltage according to the feedback voltage, a pulse, and a digital signal, wherein the voltage generation unit comprises:
a switch for being turned on according to the pulse, wherein when the switch is turned on, the first voltage is pulled down to ground;
a current source for providing a charging current controlled by the feedback voltage; and
a variable capacitor coupled between the current source and the ground for periodically increasing a capacitance of the variable capacitor with time after decreasing the capacitance of the variable capacitor with time, or periodically decreasing the capacitance of the variable capacitor with time after increasing the capacitance of the variable capacitor according to the digital signal, and for generating the first voltage according to the charging current and the capacitance when the switch is turned off;
a pulse generator for generating the pulse when a control signal controlling a power switch of a primary side of the power converter is enabled; and
a comparator for controlling enabling and disabling of a switching signal according to the first voltage and a reference voltage.

7. The controller of claim 6, further comprising:
a gate pin, wherein the control signal is transmitted to the power switch through the gate pin, and the pulse generator is coupled to the gate pin.

8. The controller of claim 6, wherein the feedback voltage corresponds to a load of the secondary side of the power converter.

9. The controller of claim 6, further comprising:
an auxiliary pin for receiving a voltage corresponding to an auxiliary winding of the power converter, wherein the control signal is enabled at a first valley of the voltage after the switching signal is disabled.

10. A method for generating jitters in a quasi resonant mode, the method comprising:
receiving a feedback voltage from a secondary side of a power converter;
generating a first voltage according to the feedback voltage and a pulse, wherein the first voltage is pulled down to ground when a switch is turned on according to the pulse, comprising:
periodically increasing a capacitance of a variable capacitor with time after decreasing the capacitance of the variable capacitor with time, or periodically decreasing the capacitance of the variable capacitor with time after increasing the capacitance of the variable capacitor according to a digital signal; and
generating the first voltage according to a charging current and the capacitance when the switch is turned off; and
controlling enabling and disabling of a switching signal according to the first voltage and a variable reference voltage;
wherein the variable reference voltage is periodically decreased with time after being increased with time, or periodically increased with time after being decreased with time within a predetermined voltage range according to the digital signal.

11. The method of claim 10, further comprising:
generating the pulse when a control signal controlling a power switch of a primary side of the power converter is enabled.

12. The method of claim 10, wherein controlling enabling and disabling of the switching signal according to the first voltage and the variable reference voltage comprises:
controlling enabling of the switching signal when the first voltage is less than the variable reference voltage.

13. The method of claim 10, wherein generating the first voltage according to the feedback voltage and the pulse comprises:
generating the first voltage according to a charging current when the switch is turned off, wherein the charging current is controlled by the feedback voltage.

14. The method of claim 13, wherein controlling enabling and disabling of the switching signal according to the first voltage and the variable reference voltage comprises:
controlling disabling of the switching signal when the first voltage is greater than the variable reference voltage.

15. A method for generating jitters in a quasi resonant mode, the method comprising:
receiving a feedback voltage from a secondary side of a power converter;
generating a first voltage according to the feedback voltage, a pulse, and a digital signal, wherein the first voltage is pulled down to ground when a switch is turned on according to the pulse, comprising:
periodically increasing a charging current of a variable current source with time after decreasing the charging current of the variable current source with time, or periodically decreasing the charging current of the variable current source with time after increasing the charging current of the variable current source according to the feedback voltage and the digital signal; and
generating the first voltage according to the charging current when the switch is turned off; and controlling enabling and disabling of a switching signal according to the first voltage and a reference voltage.

16. The method of claim 15, further comprising:
generating the pulse when a control signal controlling a power switch of a primary side of the power converter is enabled.

17. The method of claim 15, wherein controlling enabling and disabling of the switching signal according to the first voltage and the reference voltage comprises:
controlling enabling of the switching signal when the first voltage is less than the reference voltage.

18. The method of claim 15, wherein controlling enabling and disabling of the switching signal according to the first voltage and the reference voltage comprises:
controlling disabling of the switching signal when the first voltage is greater than the reference voltage.

* * * * *